(12) United States Patent
Kato

(10) Patent No.: US 8,077,871 B2
(45) Date of Patent: Dec. 13, 2011

(54) CONTENT PROCESSING APPARATUS AND ENCRYPTION PROCESSING METHOD

(75) Inventor: Taku Kato, Kamakura (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 878 days.

(21) Appl. No.: 12/055,069

(22) Filed: Mar. 25, 2008

(65) Prior Publication Data

US 2008/0247548 A1    Oct. 9, 2008

(30) Foreign Application Priority Data

Mar. 29, 2007    (JP) ................................. 2007-087189

(51) Int. Cl.
*H04L 9/00*    (2006.01)
(52) U.S. Cl. ............................ 380/277; 380/201; 380/45
(58) Field of Classification Search .................... None
See application file for complete search history.

(56) References Cited

U.S. PATENT DOCUMENTS

| | | | | |
|---|---|---|---|---|
| 5,392,351 A * | 2/1995 | Hasebe et al. | ................... | 705/51 |
| 6,748,539 B1 * | 6/2004 | Lotspiech | ....................... | 726/20 |
| 6,832,731 B2 * | 12/2004 | Kaneko | .......................... | 235/492 |
| 6,901,385 B2 * | 5/2005 | Okamoto et al. | ................ | 705/51 |
| 6,965,996 B2 * | 11/2005 | Hirano et al. | .................. | 713/176 |
| 7,013,010 B2 * | 3/2006 | Ripley | .......................... | 380/201 |
| 7,065,504 B2 * | 6/2006 | Sakuma et al. | ................. | 705/52 |
| 7,689,836 B2 * | 3/2010 | Nagase et al. | ................. | 713/189 |
| 2002/0194475 A1 * | 12/2002 | Ishiguro et al. | ............... | 713/168 |
| 2003/0152222 A1 * | 8/2003 | Nakano et al. | ................. | 380/201 |
| 2003/0161473 A1 * | 8/2003 | Fransdonk | .................... | 380/277 |
| 2004/0172549 A1 | 9/2004 | Kojima et al. | ................ | 713/193 |

FOREIGN PATENT DOCUMENTS

WO    WO 2005/091163 A1    9/2005

OTHER PUBLICATIONS

European Search Report dated Feb. 25, 2010 from corresponding EP Application No. 08005819.1.
Intel Corporation, et al., "*Content Protection for Recordable Media Specification—Portable ATA Storage Book*", May 30, 2001, Rev. 0.92, 13 pps.

* cited by examiner

*Primary Examiner* — Saleh Najjar
*Assistant Examiner* — Dustin Bone
(74) *Attorney, Agent, or Firm* — Ohlandt, Greeley, Ruggiero & Perle, L.L.P.

(57) ABSTRACT

A content processing apparatus includes a read unit which reads encrypted key information from a recording medium, a decryption unit which decrypts the encrypted key information with a device key and dynamic information to obtain key information containing content keys, an update unit which updates the dynamic information, a key information processing unit which updates the key information by extracting a content key corresponding to a move target content from the key information, and removing the content key from the key information, a first encryption unit which encrypts the updated key information with the device key and the updated dynamic information, a second encryption unit which encrypts the content key with a shared key, and a write unit which overwrites the updated encrypted key information on the encrypted key information in the medium and writes the encrypted content key in the medium.

19 Claims, 9 Drawing Sheets

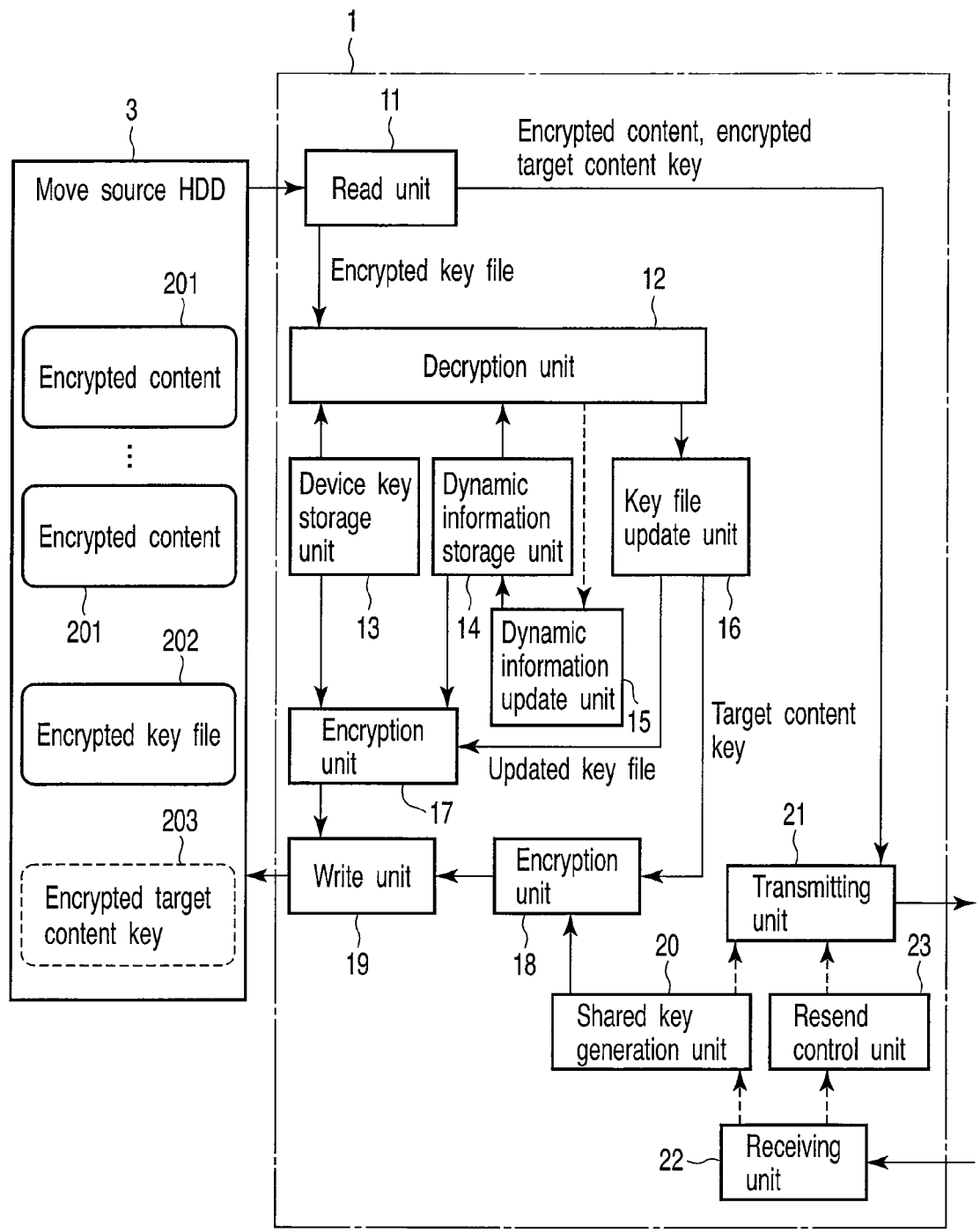
F I G. 2

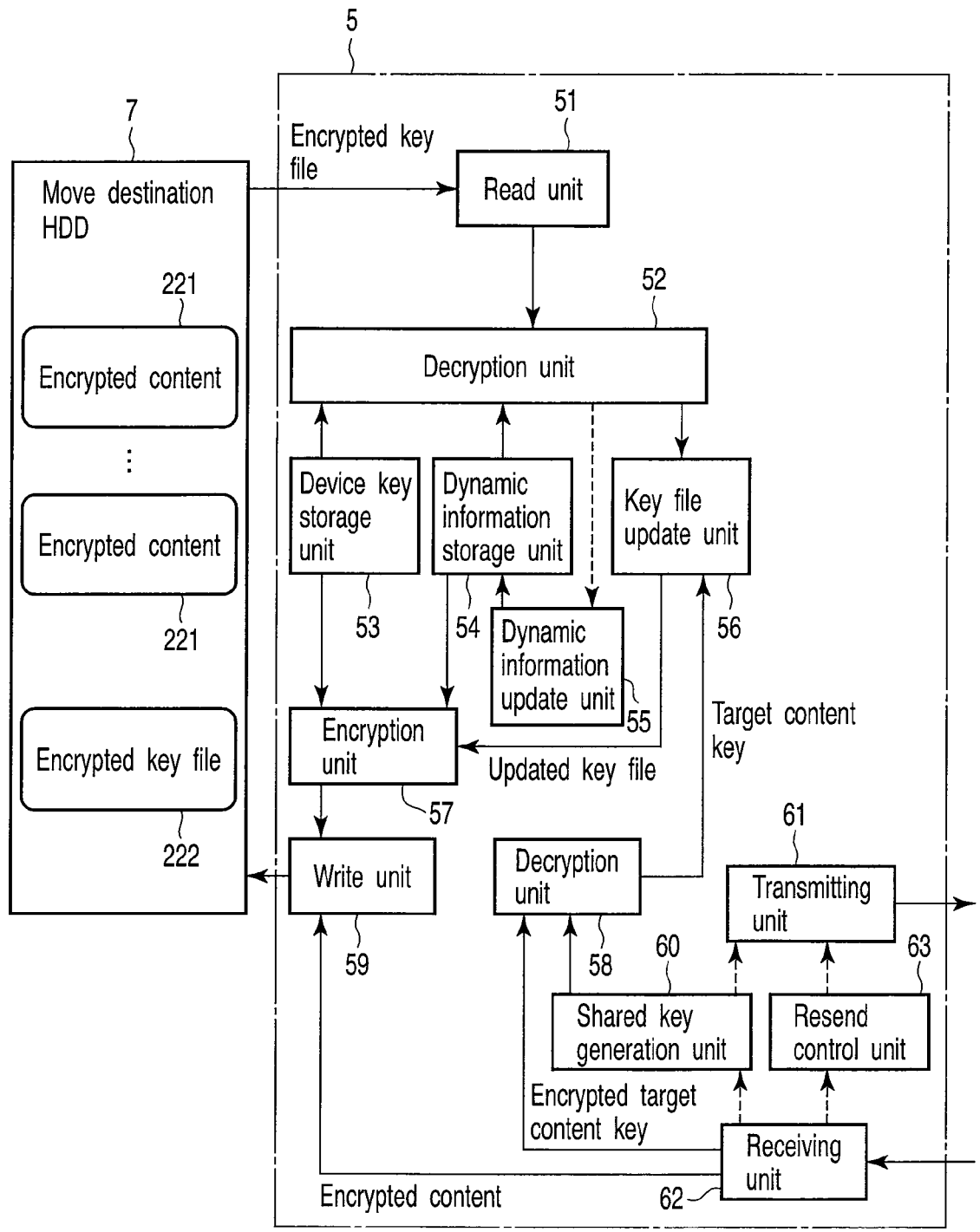
F I G. 3

CONTENT PROCESSING APPARATUS AND ENCRYPTION PROCESSING METHOD

CROSS-REFERENCE TO RELATED APPLICATIONS

This application is based upon and claims the benefit of priority from prior Japanese Patent Application No. 2007-087189, filed Mar. 29, 2007, the entire contents of which are incorporated herein by reference.

BACKGROUND OF THE INVENTION

1. Field of the Invention

The present invention relates to a content processing apparatus and encryption processing method which process contents.

2. Description of the Related Art

There are a various kinds of contents. They include contents which do not require protection and those which require it. The latter contents are protected by several forms. One of the forms is "copy is inhibited, but move is permitted".

Examine a case in which a content whose "copy is inhibited but move is permitted" can be moved from a first recording medium to a second recording medium.

For example, assume a move procedure of copying the content from the first recording medium to the second recording medium in the first step and then deleting the content from the first recording medium in the second step. If this move procedure correctly finishes, no problem rises. However, if the procedure is interrupted between the first step and the second step, a "state in which the content is copied from the first recording medium to the second recording medium" occurs.

Occurrence of this state poses a problem when copy is inhibited. Hence, a means for preventing occurrence of this state is necessary.

There is a method of encrypting a content and recording, in a recording medium, a pair of the encrypted content and a content key necessary for decryption.

In this case, even when the content whose "copy is inhibited but move is permitted" is copied from the first recording medium to the second recording medium, copy protection of the content can actually be achieved by moving the content key from the first recording medium to the second recording medium without copy.

For example, assume a move procedure of copying the encrypted content from the first recording medium to the second recording medium in the first step and then copying the content key from the first recording medium to the second recording medium and deleting the content key from the first recording medium in the second step. If this move procedure correctly finishes, no problem rises. Even if the encrypted content is not correctly transmitted due to a poor transmission path quality, or a recording error occurs in the second recording medium, the encrypted content can be resent any number of times. It is also possible to interrupt the move processing and restore the initial state of the move processing. However, if it is possible to restore the initial state in the second step, a "state in which the content key is copied from the first recording medium to the second recording medium" can be caused by intentionally disconnecting a response or altering a response. To prevent this, it is necessary to delete the content key from the first recording medium early. However, if the content key is not recorded in the second recording medium in the second step, a "state in which the content key is stored in neither the first recording medium nor second recording medium" occurs because resend of the content key is possible.

If this state occurs, the encrypted content cannot be decrypted by using either of the first recording medium and second recording medium. Hence, occurrence of this state also poses a problem.

An attack called "save/restore attack" is known. A technical specification under the technical license of 4C Entity LLC ("Content Protection for Recordable Media Specification, Portable ATA Storage Book" (http://www.4Centity.com/)), and the like have disclosed a technique of preventing the save/restore attack by using dynamic information for encryption processing.

However, the technique disclosed in this technical specification cannot avoid the problem.

As described above, conventionally, it is impossible to safely and reliably move, between recording media, a content key necessary for decryption of a copy-protected content.

BRIEF SUMMARY OF THE INVENTION

The present invention has been made in consideration of the above situation, and has as its object to provide a content processing apparatus and encryption processing method capable of safely and reliably move, between recording media, a content key necessary for decryption of a copy-protected content.

According to an aspect of the present invention, there is provided a content processing apparatus includes a read unit configured to read out, from the recording medium recording at least one encrypted content and first encrypted key information formed by encrypting first key information containing content keys corresponding to the encrypted contents, the first encrypted key information; a first storage unit configured to store a unique device key; a second storage unit configured to store dynamic information; a decryption unit configured to decrypt the first encrypted key information by using the device key and the dynamic information to obtain decrypted first key information; an update unit configured to update the dynamic information stored in the second storage unit to obtain updated dynamic information; a key information processing unit configured to extract a target content key serving as a content key corresponding to a move target encrypted content from the decrypted first key information, and generate second key information by removing the target content key from the decrypted first key information; a first encryption unit configured to encrypt the second key information by using the device key and the updated dynamic information to obtain second encrypted key information; a shared key generation unit configured to generate a shared key; a second encryption unit configured to encrypt the target content key by using the shared key to obtain an encrypted content key; and a write unit configured to write the second encrypted key information in the recording medium by overwriting the second encrypted key information on the first encrypted key information and write the encrypted content key in the recording medium.

BRIEF DESCRIPTION OF THE SEVERAL VIEWS OF THE DRAWING

FIG. 2 is a block diagram showing an arrangement example of a transmitting device according to the embodiment;

FIG. 3 is a block diagram showing an arrangement example of a receiving device according to the embodiment;

DETAILED DESCRIPTION OF THE INVENTION

An embodiment of the present invention will be described below with reference to the accompanying drawing.

There are contents which request content protection. For some of such contents, copy is inhibited, but move is permitted. In this embodiment, a copy-inhibited move-permitted content is moved from a move source recording medium to a move destination recording medium.

In this embodiment, the move source recording medium records one or more copy-inhibited move-permitted contents in an encrypted state. The move source recording medium also records a set of encrypted content keys corresponding to the respective encrypted contents. In this embodiment, an encrypted content key corresponding to a copy-inhibited move-permitted content is moved from the move source recording medium to the move destination recording medium (in this case, it does not matter if the encrypted content is copied from the move source recording medium to the move destination recording medium).

Figure 1:
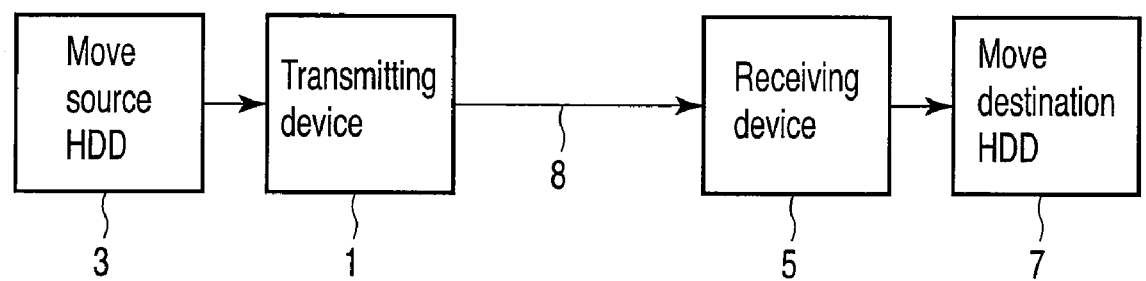
FIG. 1 is a block diagram showing an arrangement example of a content processing system according to an embodiment.

FIG. 1 shows an arrangement example of a content processing system according to an embodiment.

Referring to FIG. 1, the system includes a transmitting device 1, a hard disk drive (move source HDD) 3 serving as a move source recording medium, a receiving device 5, a hard disk drive (move destination HDD) 7 serving as a move destination recording medium, and network 8. The network 8 can be of any type and is not particularly limited.

In this embodiment, the transmitting device 1 and receiving device 5 execute authentication/key exchange processing in cooperation so that the transmitting device 1 and receiving device 5 share a shared key.

Overall, the transmitting device 1 sequentially reads out a moving target encrypted content and an encrypted content key corresponding to it from the moving source HDD 3. The transmitting device 1 sequentially transmits the encrypted content and encrypted content key to the receiving device 5 via the network 8. After saving the encrypted content key in the moving destination HDD 7, the transmitting device 1 deletes the encrypted content key from the moving source HDD 3. Note that it does not matter whether the transmitting device 1 deletes the encrypted content or not.

In other word, the transmitting device 1 sequentially reads out a move target encrypted content and an encrypted content key corresponding to it from the move source HDD 3. The transmitting device 1 sequentially transmits the encrypted content and [encrypted] content key which is encrypted by shared key to the receiving device 5 via the network 8. After saving the [encrypted] content key encrypted by shared key in the move destination HDD 7, the transmitting device 1 deletes the [encrypted] content key encrypted by shared key from the move source HDD 3. Note that it does not matter whether the transmitting device 1 deletes the encrypted content or not.

Overall, the receiving device 5 sequentially receives the encrypted content and the encrypted content key corresponding to it from the transmitting device 1. The receiving device 5 also sequentially records the received encrypted content and encrypted content key in the moving destination HDD 7.

In other word, the receiving device 5 sequentially receives the encrypted content and the [encrypted] content key encrypted by shared key corresponding to it from the transmitting device 1. The receiving device 5 also sequentially records the received encrypted content and the [encrypted] content key encrypted by shared key in the move destination HDD 7. The content key encrypted by shared key is decrypted in the decryption unit (58 in FIG. 3), and the content key added to the key file by the key file update unit (56 in FIG. 3). The key file including the content key received from the transmitting device 1 is encrypted by the device key and the dynamic information in the encryption unit (57 in FIG. 3). The [encrypted] key file encrypted by the device key and the dynamic information is recorded in the moving destination HDD 7 by the write unit (59 in FIG. 3).

In this embodiment, the move source HDD 3 holds the [encrypted] content key encrypted by the shared key until the move of the [encrypted] content key finally finishes, thereby implementing more safe and reliable move.

If the move source HDD 3 also records management information corresponding to the move target encrypted content, the management information is also copied or moved from the move source HDD 3 to the move destination HDD 7. The management information describes, e.g., information about the content or information about copy control, as needed. Note that the management information may be contained in a key file to be described later. A description of the management information will be omitted.

An HDD will be exemplified herein as the move source recording medium or move destination recording medium. However, the move source recording medium or move destination recording medium need not always be integrated with the transmitting device 1 or receiving device 5. Various recording media such as a flash memory or recording DVD disk are also usable as the move source recording medium or move destination recording medium.

FIG. 2 is a block diagram showing an arrangement example of the transmitting device 1 according to the embodiment.

The transmitting device 1 includes a read unit 11, decryption unit 12, device key storage unit 13, dynamic information storage unit 14, dynamic information update unit 15, key file update unit 16, encryption unit 17, encryption unit 18, write unit 19, shared key generation unit 20, transmitting unit 21, receiving unit 22, and resend control unit 23.

FIG. 3 is a block diagram showing an arrangement example of the receiving device 5 according to the embodiment.

The receiving device 5 includes a read unit 51, decryption unit 52, device key storage unit 53, dynamic information storage unit 54, dynamic information update unit 55, key file update unit 56, encryption unit 57, decryption unit 58, write unit 59, shared key generation unit 60, transmitting unit 61, receiving unit 62, and resend control unit 63.

Anyone can read- or write-access the recording areas of the HDDs 3 and 7 without using any special means.

The device key storage unit 13 of the transmitting device 1 stores a device key (secret key) unique to the transmitting device 1 without leaking it to the outside.

The dynamic information storage unit 14 of the transmitting device 1 stores dynamic information in an area that is not externally rewritable. The dynamic information update unit 15 updates the dynamic information stored in the dynamic information storage unit 14 to a new value. The update is done at least every time move processing is executed. Note that the dynamic information storage unit 14 and dynamic information update unit 15 may be integrated.

The device key storage unit 53 of the receiving device 5 stores a device key (secret key) unique to the receiving device 5 without leaking it to the outside.

The dynamic information storage unit 54 of the receiving device 5 stores dynamic information in an area that is not externally rewritable. The dynamic information update unit 55 updates the dynamic information stored in the dynamic information storage unit 54 to a new value. The update is done at least every time move processing is executed. Note that the dynamic information storage unit 54 and dynamic information update unit 55 may be integrated.

The move source HDD 3 records one or more copy-inhibited move-permitted encrypted contents (201 in FIG. 2). The encrypted contents are obtained by encrypting contents by using corresponding content keys. The move source HDD 3 also records a key file in an encrypted state (202 in FIG. 2). The key file contains content keys corresponding to the respective encrypted contents. The encrypted key file recorded in the move source HDD 3 is created by encrypting a key file by using the device key stored in the device key storage unit 13 of the transmitting device 1 and the dynamic information stored in the dynamic information storage unit 14 of the transmitting device 1.

The move destination HDD 7 records one or more copy-inhibited move-permitted encrypted contents (the move destination HDD 7 need not have an encrypted content in the initial state) (221 in FIG. 3). The encrypted contents are obtained by encrypting contents by using corresponding content keys. The move destination HDD 7 also records a key file in an encrypted state (222 in FIG. 3). The key file contains content keys corresponding to the respective encrypted contents. The encrypted key file recorded in the move destination HDD 7 is created by encrypting a key file by using the device key stored in the device key storage unit 53 of the receiving device 5 and the dynamic information stored in the dynamic information storage unit 54 of the receiving device 5.

The key file containing the content keys has a file format herein. However, the key file need not always have the file format and can be data with any other format.

A case in which the transmitting device 1 adds a content to the move source HDD 3 and a case in which the transmitting device 1 uses a content in the move source HDD 3 will be described later.

The operation sequence of content move process in the content processing system shown in FIG. 1 will be described below.

Figure 4:
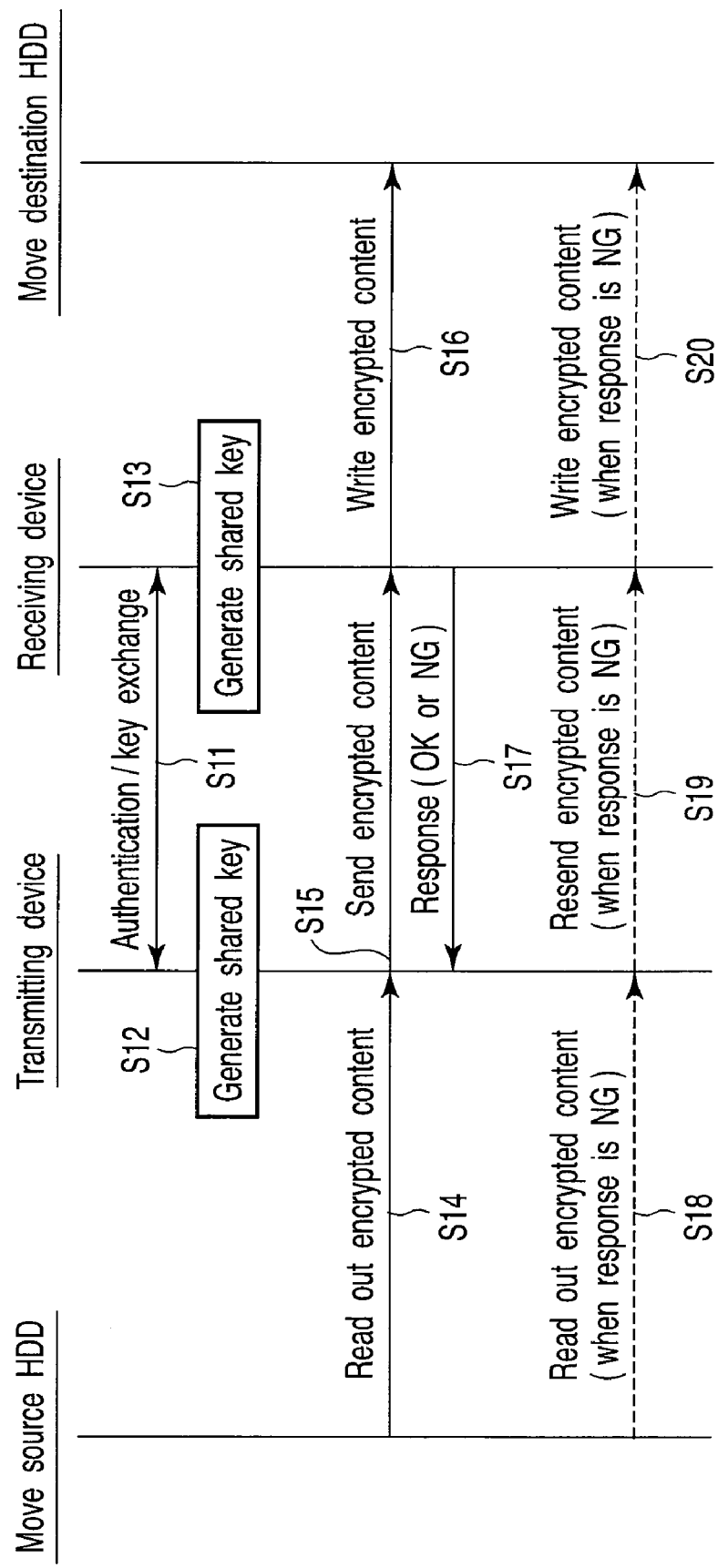
FIG. 4 is a sequence chart showing an example of the operation sequence of content move processing in the content processing system.
Figure 5:
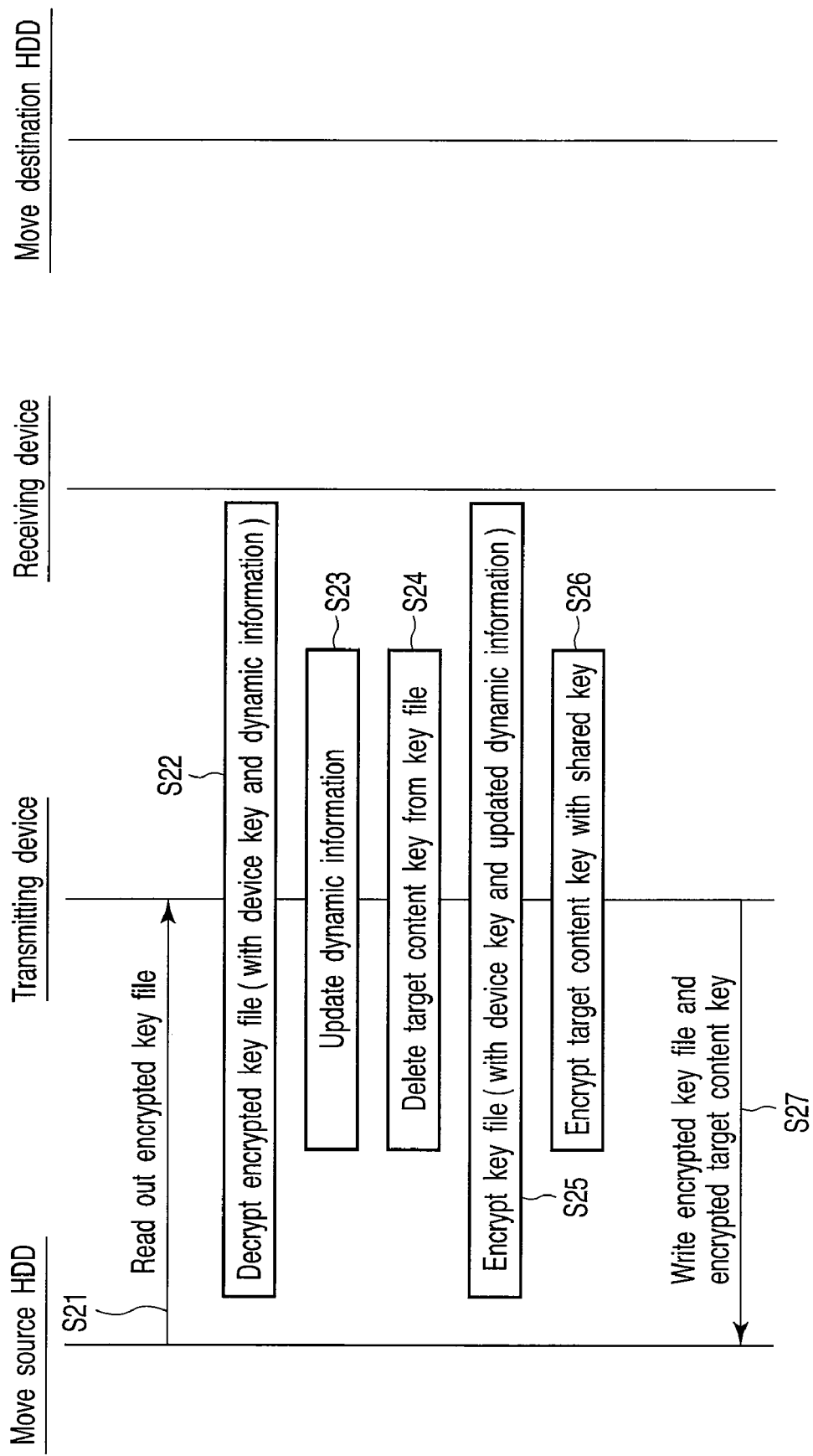
FIG. 5 is a sequence chart showing the example of the operation sequence (part following FIG. 4)
Figure 6:
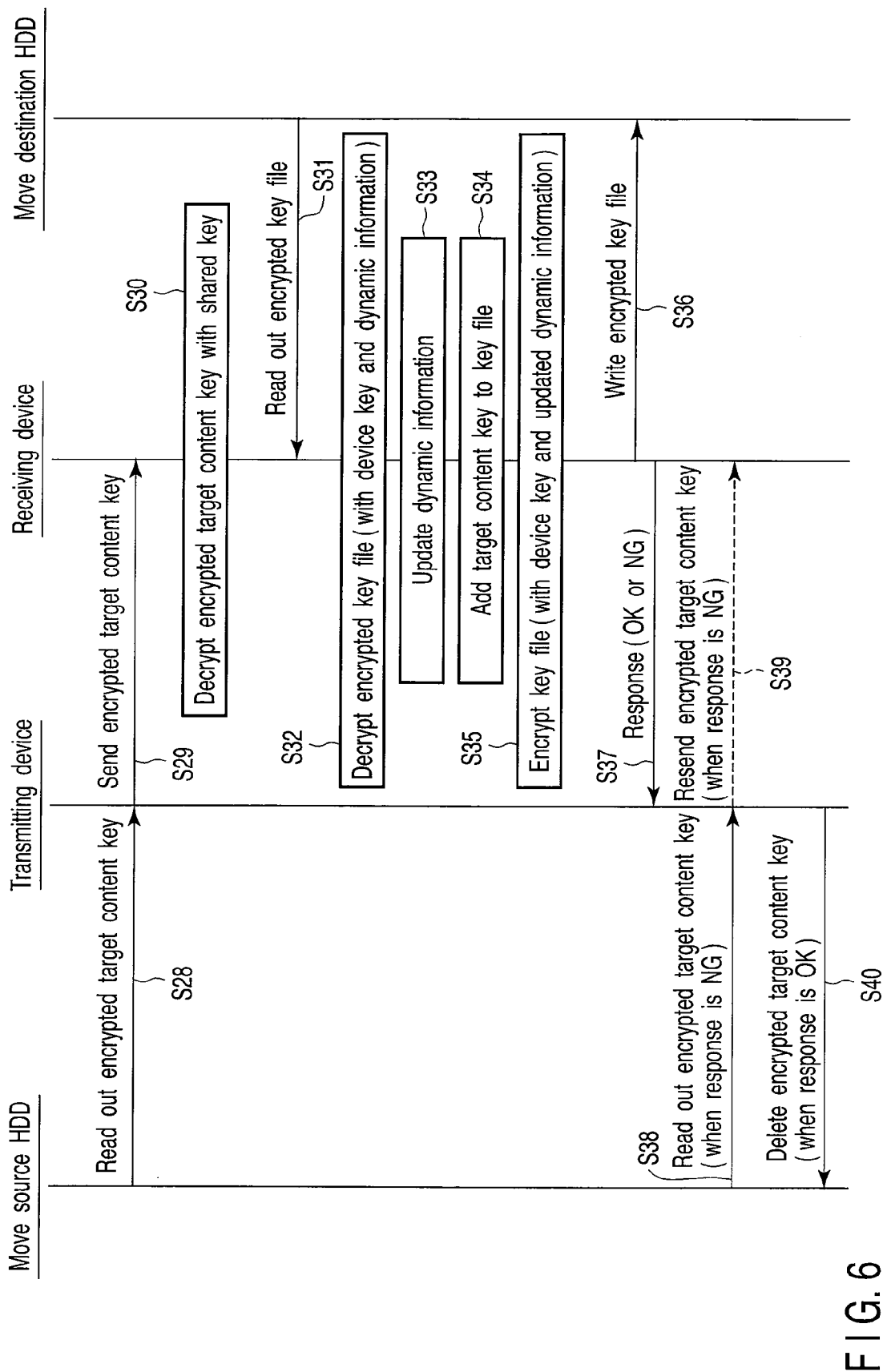
FIG. 6 is a sequence chart showing the example of the operation sequence (part following FIG. 5)

FIG. 4, FIG. 5 next to FIG. 4, and FIG. 6 next to FIG. 5 show an example of the operation sequence of content move process.

<Authentication/Key Exchange>

The transmitting device 1 and receiving device 5 execute authentication/key exchange processing in cooperation (step S11). With this processing, the transmitting device 1 and receiving device 5 generate identical shared keys (steps S12 and S13). The shared key is used in transmitting (move) a content key corresponding to a move target encrypted content. As the algorithm of the authentication/key exchange processing, various existing algorithms represented by, e.g., the Diffie-Hellman method are usable.

<Move or Copy of Encrypted Content>

The read unit 11 of the transmitting device 1 reads out a move target encrypted content from the move source HDD 3 (step S14). The transmitting unit 21 of the transmitting device 1 transmits the readout encrypted content to the receiving device 5 via the network 8 (step S15).

The receiving unit 62 of the receiving device 5 receives the encrypted content from the transmitting device 1 (step S15). The write unit 59 writes the received encrypted content in the move destination HDD 7 (step S16).

When the write of the encrypted content in the move destination HDD 7 is normally completed, the resend control unit 63 of the receiving device 5 transmits a message representing a success to the transmitting device 1 via the transmitting unit 61 (step S17). If the transmitting device 1 should resend the encrypted content because of, e.g., a communication error, the resend control unit 63 of the receiving device 5 transmits a message representing a failure to the transmitting device 1 via the transmitting unit 61 (step S17).

Upon receiving a message representing a failure from the receiving device 5 via the receiving unit 22, the resend control unit 23 of the transmitting device 1 executes the same processing as in steps S14 to S16 again (steps S18 to S20).

Steps S18 to S20 are repeatedly executed until the resend control unit 23 of the transmitting device 1 receives a message representing a success from the receiving device 5 via the receiving unit 22.

In the above example, the transmitting device 1 designates the receiving device 5 and sends the move target encrypted content. If the receiving device 5 can access the move target encrypted content in the move source HDD 3 without intervening the transmitting device 1, the receiving device 5 can actively read out the encrypted content from the move source HDD 3 instead of performing the above processing.

In this embodiment, the content key corresponding to the move target encrypted content is moved from the move source HDD 3 to the move destination HDD 7. Hence, the move target encrypted content may be copied from the move source HDD 3 to the move destination HDD 7. In this case, when the resend control unit 23 of the transmitting device 1 receives a message representing a success, the write unit 19 of the transmitting device 1 may delete the move target encrypted content from the move source HDD 3.

<Content Key Move (Transmitting Device 1 Side)>

The read unit 11 of the transmitting device 1 reads out the encrypted key file from the move source HDD 3 and supplies the readout encrypted key file to the decryption unit 12 (step S21).

The decryption unit 12 acquires the device key which is hidden in the device key storage unit 13 not to be accessible from an external device and the dynamic information at the current time which is stored in the dynamic information storage unit 14 not to be externally rewritable and then decrypts the encrypted key file by using the device key and the dynamic information at the current time (step S22). After that, the dynamic information update unit 15 immediately updates the dynamic information in the dynamic information storage unit 14 (step S23).

In step S24, the key file update unit 16 executes the following processing. First, the key file update unit 16 extracts the content key (target content key) corresponding to the move target encrypted content from the key file obtained by decryption. The key file update unit 16 supplies the extracted target content key to the encryption unit 18, and simultaneously, deletes the target content key from the key file, thereby updating the key file. The key file update unit 16 supplies the updated key file to the encryption unit 17.

The encryption unit 17 acquires the device key stored in the device key storage unit 13 and the dynamic information (updated dynamic information) stored in the dynamic information storage unit 14 and then encrypts the updated key file by using the device key and the updated dynamic information (step S25). The encryption unit 18 also encrypts the target content key by using the shared key (step S26).

In step S27, the write unit 19 executes the following processing. The write unit 19 writes back (i.e., overwrites) the encrypted key file (i.e., encrypted updated key file) generated by the encryption unit 17 in the move source HDD 3. Simultaneously, the write unit 19 records the encrypted target content key generated by the encryption unit 18 in the move source HDD 3 (203 in FIG. 2).

If it is impossible to simultaneously write back (overwrite) the encrypted key file in the move source HDD 3 and write the encrypted target content key in the move source HDD 3, the write back (overwrite) of the encrypted key file and recording of the encrypted target content key in the move source HDD 3 are executed in this order or in a reverse order.

Next, the read unit 11 reads out the encrypted target content key from the move source HDD 3 (step S28). The transmitting device 1 transmits the readout encrypted target content key to the receiving device 5 via the network 8 (step S29).

In the above example, the read unit 11 reads out the encrypted target content key from the move source HDD 3, and the transmitting device 1 transmits the readout encrypted target content key to the receiving device 5 via the network 8. Instead, the transmitting unit 21 may receive, from the encryption unit 18, the encrypted target content key obtained by the encryption unit 18 and transmit the encrypted target content key to the receiving device 5 via the network 8.

<Content Key Move (Receiving Device 5 Side)>

The receiving unit 62 of the receiving device 5 receives the encrypted target content key from the transmitting device 1 (step S29). The decryption unit 58 decrypts the received encrypted target content key by using the shared key (step S30).

The read unit 51 reads out the encrypted key file from the move destination HDD 7 and supplies the readout encrypted key file to the decryption unit 52 (step S31).

The decryption unit 52 acquires the device key which is hidden in the device key storage unit 53 not to be accessible from an external device and the dynamic information at the current time which is stored in the dynamic information storage unit 54 not to be externally rewritable and then decrypts the encrypted key file by using the device key and the dynamic information at the current time (step S32). After that, the dynamic information update unit 55 immediately updates the dynamic information in the dynamic information storage unit 54 (step S33).

In step S34, the key file update unit 56 executes the following processing. The key file update unit 56 adds the target content key to the key file obtained by the decryption unit 52, thereby updating the key file. The key file update unit 56 supplies the updated key file to the encryption unit 57 (step S34).

The encryption unit 57 acquires the device key stored in the device key storage unit 53 and the dynamic information (updated dynamic information) stored in the dynamic information storage unit 54 and then encrypts the updated key file by using the device key and the updated dynamic information (step S35).

The write unit 59 writes back (i.e., overwrites) the encrypted key file (i.e., encrypted updated key file) generated by the encryption unit 57 in the move destination HDD 7 (step S36).

When the write of the encrypted target content key in the move destination HDD 7 is normally completed, the resend control unit 63 of the receiving device 5 transmits a message representing a success to the transmitting device 1 via the transmitting unit 61 (step S37). If the transmitting device 1 should resend the encrypted target content key because of, e.g., a communication error, the resend control unit 63 of the receiving device 5 transmits a message representing a failure to the transmitting device 1 via the transmitting unit 61 (step S37).

Upon receiving a message representing a failure from the receiving device 5 via the receiving unit 22, the resend control unit 23 of the transmitting device 1 executes the same processing as in steps S28 and S29 again (steps S38 and 39).

Steps S38 and 39 are repeatedly executed until the resend control unit 23 of the transmitting device 1 receives a message representing a success from the receiving device 5 via the receiving unit 22.

When the resend control unit 23 of the transmitting device 1 receives a message representing a success, the write unit 19 of the transmitting device 1 deletes the encrypted target content key from the move source HDD 3 (step S40).

The operation sequence in FIGS. 4 to 6 is a mere example. The execution order of the process steps can be changed, as needed, under the restrictions necessarily imposed to the execution order between the process steps.

In the above example, the transmitting device 1 designates the receiving device 5 and sends the encrypted target content key. If the receiving device 5 can access the encrypted target content key in the move source HDD 3 without intervening the transmitting device 1, the receiving device 5 can actively read out the encrypted target content key from the move source HDD 3 instead of performing the above processing.

Figure 7:
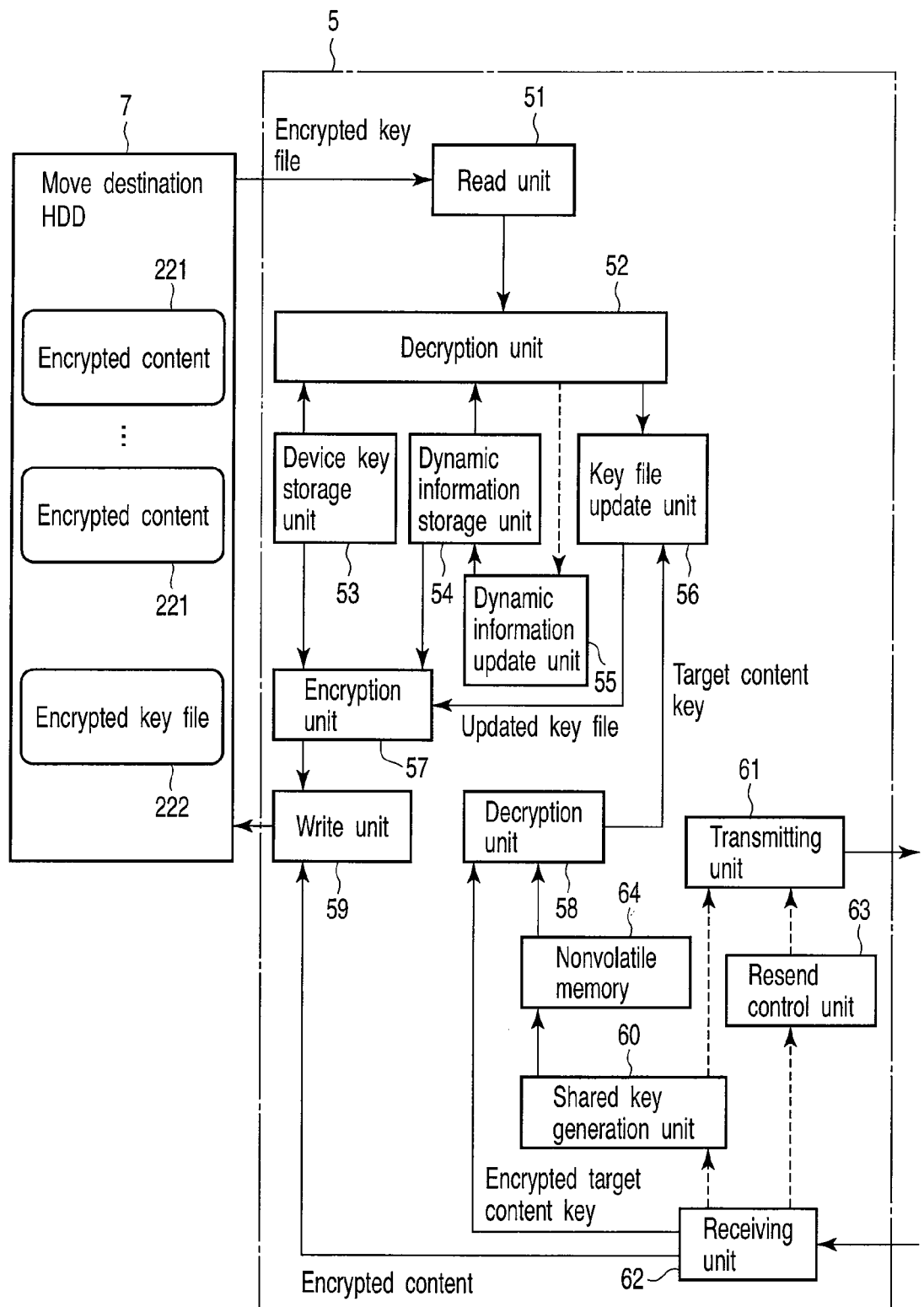
FIG. 7 is a block diagram showing another arrangement example of the receiving device.

As shown in FIG. 7, an externally inaccessible nonvolatile memory 64 may be added to the arrangement of the receiving device 5 in FIG. 3 to store the shared key generated by the shared key generation unit 60. When the shared key is hidden not to be externally accessible, the system can flexibly cope with an unexpected power failure or the like.

In this case, the nonvolatile memory 64 stores the shared key generated by the shared key generation unit 60 of the receiving device 5 in step S13 of the operation sequence in FIGS. 4 to 6.

In the operation sequence in FIGS. 4 to 6, if the content move processing in the receiving device 5 has finished due to, e.g., a power failure or transmission path disconnection before the processing of causing the write unit 19 to record the encrypted target content key in the move source HDD 3 (step S27) is ended, the operation sequence in FIGS. 4 to 6 can be executed again from the beginning after the system is re-powered on. For this reason, the move target encrypted content and corresponding content key are not lost.

If the content move processing in the receiving device 5 has finished due to, e.g., a power failure or transmission path disconnection before the processing of causing the write unit 19 to record the encrypted target content key in the move source HDD 3 (step S27) is ended, the processing from step S28 can be continued as long as the nonvolatile memory 64 of the receiving device 5 stores the shared key. It is therefore possible to properly move the content key (i.e., target content key) corresponding to the move target encrypted content to the move destination HDD 7.

That is, in extreme cases, the processing in steps S11 to S27 and that in steps S28 to S40 can be done completely separately.

A case in which the transmitting device 1 adds a content to the HDD 3 will be described herein.

Figure 8:
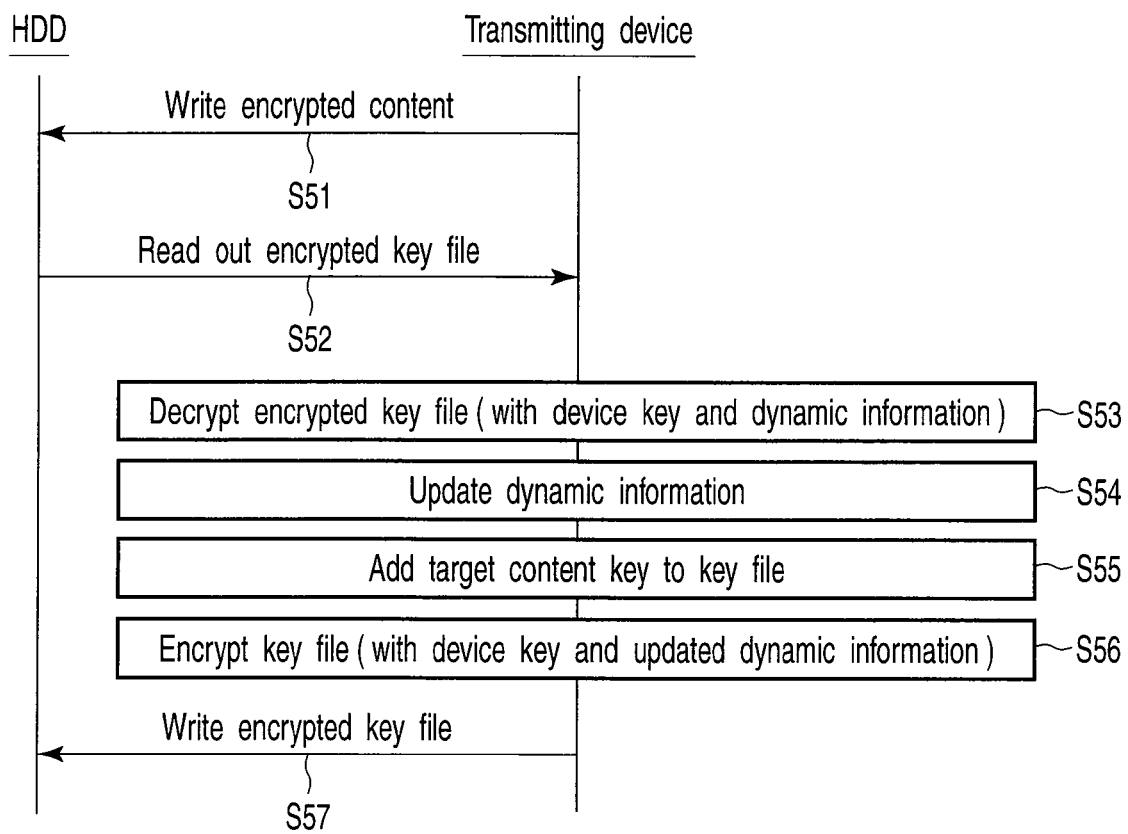
FIG. 8 is a sequence chart showing an example of the operation sequence of content addition processing in the transmitting device.

FIG. 8 shows an example of the operation sequence in this case.

First, the write unit 19 of the transmitting device 1 writes an addition target encrypted content in the HDD 3 (step S51).

The read unit 11 reads out the encrypted key file from the HDD 3 and supplies the readout encrypted key file to the decryption unit 12 (step S52).

The decryption unit 12 acquires the device key in the device key storage unit 13 and the dynamic information in the dynamic information storage unit 14 and then decrypts the encrypted key file by using the device key and the dynamic information (step S53). After that, the dynamic information update unit 15 immediately updates the dynamic information in the dynamic information storage unit 14 (step S54).

In step S55, the key file update unit 16 executes the following processing. The key file update unit 16 adds a content key (target content key) corresponding to the addition target encrypted content to the key file obtained by the decryption unit 12, thereby updating the key file. The key file update unit 16 supplies the updated key file to the encryption unit 17.

The encryption unit 17 acquires the device key in the device key storage unit 13 and the dynamic information (updated dynamic information) in the dynamic information storage unit 14 and then encrypts the updated key file by using the device key and the updated dynamic information (step S56).

The write unit 19 writes back (i.e., overwrites) the encrypted key file (i.e., encrypted updated key file) generated by the encryption unit 17 in the HDD 3 (step S57).

In the above procedure, the dynamic information need not always be updated. In this case, step S54 is omitted.

A case in which the transmitting device 1 uses a content to the HDD 3 will be described next.

Figure 9:
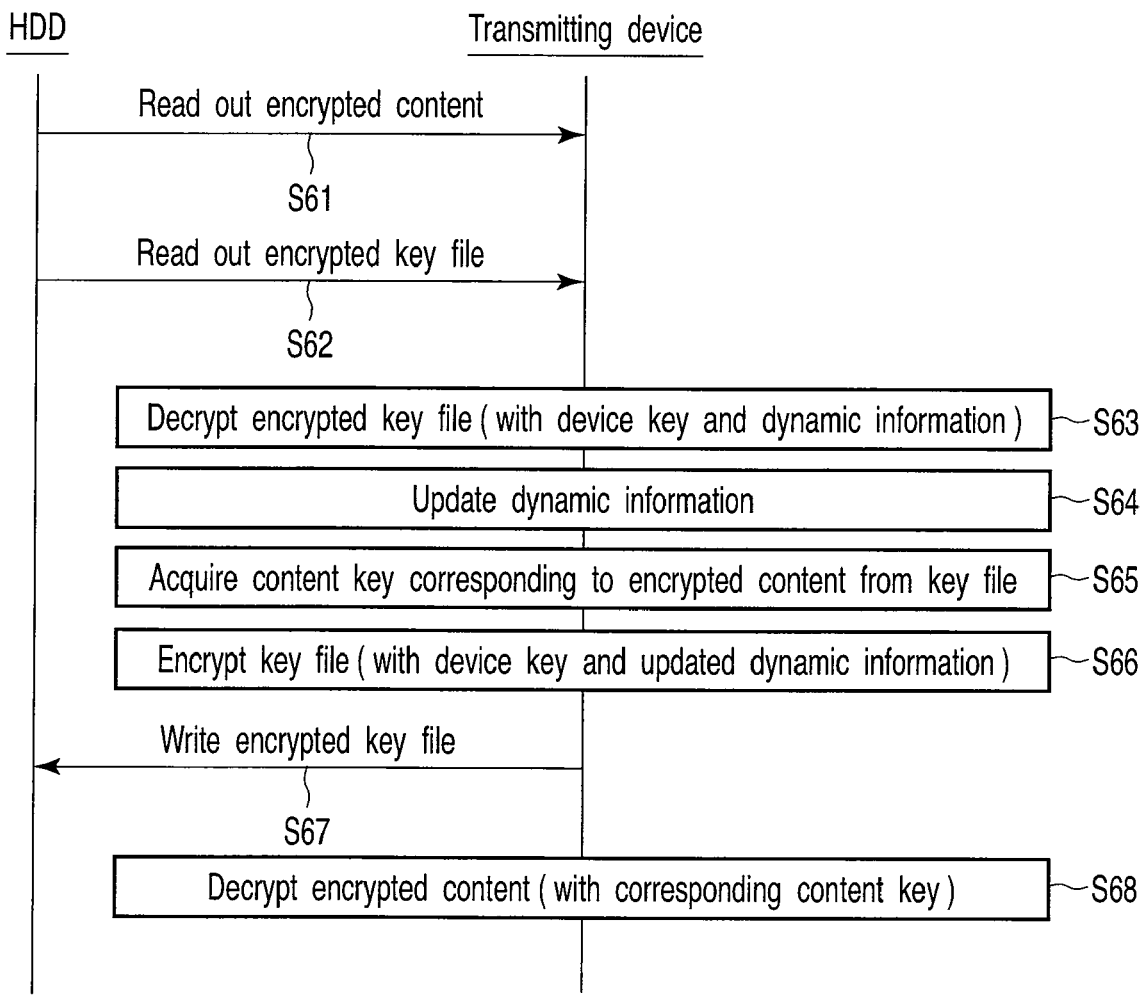
FIG. 9 is a sequence chart showing an example of the operation sequence of content using processing in the transmitting device.

FIG. 9 shows an example of the operation sequence in this case.

First, the read unit 11 of the transmitting device 1 reads out a use target encrypted content from the HDD 3 (step S61).

The read unit 11 reads out the encrypted key file from the HDD 3 and supplies the readout encrypted key file to the decryption unit 12 (step S62).

The decryption unit 12 acquires the device key in the device key storage unit 13 and the dynamic information in the dynamic information storage unit 14 and then decrypts the encrypted key file by using the device key and the dynamic information (step S63). After that, the dynamic information update unit 15 immediately updates the dynamic information in the dynamic information storage unit 14 (step S64).

In step S65, the key file update unit 16 executes the following processing. The key file update unit 16 extracts a content key (target content key) corresponding to the use target encrypted content from the key file obtained by the decryption unit 12 and supplies the extracted key file to the encryption unit 17 without update (step S65).

The encryption unit 17 acquires the device key in the device key storage unit 13 and the dynamic information (updated dynamic information) in the dynamic information storage unit 14 and then encrypts the key file by using the device key and the updated dynamic information (step S66).

The write unit 19 writes back (i.e., overwrites) the encrypted key file (i.e., encrypted updated key file) generated by the encryption unit 17 in the HDD 3 (step S67).

As a result, the transmitting device 1 can, e.g., decrypt the use target encrypted content readout by the read unit 11 by using the target content key extracted by the key file update unit 16 (step S68).

In the above procedure, the dynamic information need not always be updated. In this case, step S64 is omitted.

In the above description, the receiving device 5 employs the same key management method as the transmitting device 1. More specifically, in moving a content, the save/restore attack is prevented by using dynamic information for the move source HDD. However, if the receiving device 5 will not behave as a transmitting device later (i.e., the content will not further be moved to another recording medium), the receiving device 5 need not always use dynamic information. Hence, the dynamic information storage unit 54 and dynamic information update unit 55 may be removed from the arrangement in FIG. 3 or 7. In this case, the decryption unit 52 performs decryption by using only the device key. The encryption unit 57 performs encryption by using only the device key. The receiving device 5 can use various key management methods other than those described above.

As described above, according to the embodiment, when a content key (target content key) corresponding to a target encrypted content is encrypted by using a key (shared key) shared in advance by the transmitting device and receiving device, and the target content key encrypted by the shared key is recorded, the following advantages are obtained. Even when an error occurs in the transmission path due to, e.g., transmission path disconnection during move process, or the system suffers an intended malicious attack such as alteration of a response message from the receiving device, playback of the move target content is never disabled. In addition, any illicit act to play back the content simultaneously in two places can be prevented. This implements more safe and reliable move of protected content data between different recording media. It is consequently possible to provide a sounder mechanism not only to a user but also a content provider.

The above-described functions can also be described as software and processed by a computer having an appropriate mechanism.

It is also possible to practice the above embodiment as a program for causing a computer to execute a predetermined procedure, causing a computer to function as a predetermined means, or causing a computer to implement a predetermined function. The embodiment can also be practiced as a computer-readable recording medium that records the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content processing apparatus using a recording medium comprising:
    a transmitting device that comprises:
    a read unit to read out from the recording medium recording at least one encrypted content and first encrypted key information formed by encrypting first key information containing content keys corresponding to the encrypted contents;
    a first storage unit to store a unique device key;
    a second storage unit to store dynamic information;
    a decryption unit to decrypt the first encrypted key information by using the device key and the dynamic information to obtain decrypted first key information;
    an update unit to update the dynamic information stored in the second storage unit to obtain updated dynamic information;

a key information processing unit to extract a target content key serving as a content key corresponding to a move target encrypted content from the decrypted first key information, and generate second key information by removing the target content key from the decrypted first key information;

a first encryption unit to encrypt the second key information by using the device key and the updated dynamic information to obtain second encrypted key information;

a shared key generation unit to generate a shared key;

a second encryption unit to encrypt the target content key by using the shared key to obtain an encrypted content key; and a write unit to write the second encrypted key information in the recording medium by overwriting the second encrypted key information on the first encrypted key information and write the encrypted content key in the recording medium.

2. The apparatus according to claim 1, further comprising a receiving device, wherein the shared key is shared between the transmitting device and the receiving device serving as a transmission destination of the encrypted content key, and the shared key generation unit generates the shared key by executing authentication/key exchange processing in cooperation with a shared key generation unit provided in the receiving device.

3. The apparatus according to claim 2, wherein the receiving device stores the generated shared key in a nonvolatile memory.

4. The apparatus according to claim 2, wherein the transmitting device further comprises a transmitting unit to transmit the encrypted content key to the receiving device.

5. The apparatus according to claim 4, wherein the read unit reads out the encrypted content key from the recording medium, and the transmitting unit transmits the readout encrypted content key to the receiving device.

6. The apparatus according to claim 4, wherein the transmitting unit transfers the encrypted content key from the second encryption unit to the receiving device.

7. The apparatus according to claim 4, wherein the receiving device decrypts the encrypted content key received from the transmitting device by using the shared key to obtain the target content key.

8. The apparatus according to claim 7, wherein the receiving device writes the target content key in a recording medium different from the recording medium in an encrypted state.

9. The apparatus according to claim 4, wherein the transmitting device further comprises a receiving unit to receive one of a first message representing a failure and a second message representing a success from the receiving device, and in which when the receiving unit receives the first message, the read unit reads out the encrypted content key from the recording medium, and the transmitting unit transmits the readout encrypted content key to the receiving device, and when the receiving unit receives the second message, the write unit deletes the encrypted content key from the recording medium.

10. The apparatus according to claim 2, wherein the receiving device reads out the encrypted content key from the recording medium without intervening from the apparatus transmitting device.

11. The apparatus according to claim 10, wherein the receiving device decrypts the encrypted content key by using the shared key to obtain the target content key.

12. The apparatus according to claim 10, wherein the receiving device writes the target content key in a recording medium different from the recording medium in an encrypted state.

13. The apparatus according to claim 2, wherein the read unit reads out the encrypted content from the recording medium, and the transmitting unit transmits the readout encrypted content to the receiving device.

14. The apparatus according to claim 13, wherein the transmitting unit transmits the encrypted content to the receiving device and then transmits the encrypted content key to the receiving device.

15. The apparatus according to claim 14, wherein the transmitting unit transmits the encrypted content to the receiving device after the shared key generation unit generates the shared key.

16. The apparatus according to claim 13, wherein the receiving device writes the encrypted content received from the transmitting device in a recording medium different from the recording medium.

17. An encryption processing method comprising steps of:
reading out, from a recording medium which records at least one encrypted content and first encrypted key information formed by encrypting first key information containing content keys corresponding to the encrypted contents, the first encrypted key information;

decrypting the first encrypted key information by using a unique device key and dynamic information to obtain decrypted first key information;

updating the dynamic information;

extracting a target content key serving as a content key corresponding to a move target encrypted content from the decrypted first key information;

generating second key information by removing the target content key from the decrypted first key information;

encrypting the second key information by using the device key and the updated dynamic information to obtain second encrypted key information;

generating a shared key;

encrypting the target content key by using the shared key to obtain an encrypted content key; and writing the second encrypted key information in the recording medium by overwriting the second encrypted key information on the first encrypted key information and writing the encrypted content key in the recording medium.

18. A non-transitory computer readable storage medium storing instructions of a computer program which when executed by a computer results in performance of steps comprising:

reading out, from a recording medium which records at least one encrypted content and first encrypted key information formed by encrypting first key information containing content keys corresponding to the encrypted contents, the first encrypted key information;

decrypting the first encrypted key information by using a unique device key and dynamic information to obtain decrypted first key information;

updating the dynamic information;

extracting a target content key serving as a content key corresponding to a move target encrypted content from the decrypted first key information;

generating second key information by removing the target content key from the decrypted first key information;

encrypting the second key information by using the device key and the updated dynamic information to obtain second encrypted key information;

generating a shared key;
encrypting the target content key by using the shared key to obtain an encrypted content key; and
writing the second encrypted key information in the recording medium by overwriting the second encrypted key information on the first encrypted key information and writing the encrypted content key in the recording medium.

19. A content processing apparatus using a recording medium comprising:
   a first storage unit storing a unique device key;
   a second storage unit storing dynamic information; and
   a computer programmed to:
      read out from the recording medium recording at least one encrypted content and first encrypted key information formed by encrypting first key information containing content keys corresponding to the encrypted contents;
      decrypt the first encrypted key information by using the device key and the dynamic information to obtain decrypted first key information;
      update the dynamic information stored in the second storage unit to obtain updated dynamic information;
      extract a target content key serving as a content key corresponding to a move target encrypted content from the decrypted first key information, and generate second key information by removing the target content key from the decrypted first key information;
      encrypt the second key information by using the device key and the updated dynamic information to obtain second encrypted key information;
      generate a shared key;
      encrypt the target content key by using the shared key to obtain an encrypted content key; and
      write the second encrypted key information in the recording medium by overwriting the second encrypted key information on the first encrypted key information and write the encrypted content key in the recording medium.

* * * * *